United States Patent [19]
Hosoe et al.

[11] Patent Number: 5,722,372
[45] Date of Patent: Mar. 3, 1998

[54] FUEL SUPPLY SYSTEM WITH CARBURETOR AIR BLEED CONTROL

[75] Inventors: Katsuharu Hosoe, Okazaki; Katsuhiko Hirano, Yokkaichi, both of Japan

[73] Assignee: Nippondenso Co., Ltd., Kariya, Japan

[21] Appl. No.: 722,677

[22] Filed: Sep. 30, 1996

[30] Foreign Application Priority Data

Oct. 23, 1995 [JP] Japan .................................. 7-274434

[51] Int. Cl.$^6$ ..................................................... F02M 7/24
[52] U.S. Cl. ..................................................... 123/438
[58] Field of Search .................................. 123/437, 438, 123/585, 586, 587, 699, 700, 701

[56] References Cited

U.S. PATENT DOCUMENTS

| | | | |
|---|---|---|---|
| 3,861,366 | 1/1975 | Masaki et al. | 123/438 |
| 4,483,300 | 11/1984 | Hosaka et al. | 123/673 |
| 4,793,306 | 12/1988 | Swain | 123/585 X |

FOREIGN PATENT DOCUMENTS

| | | | |
|---|---|---|---|
| 2685382 | 6/1993 | France | 123/585 |
| 2612120 | 10/1976 | Germany | 123/699 |
| A-55-104554 | 8/1980 | Japan . | |
| A-62-191650 | 8/1987 | Japan . | |
| A-3-246357 | 11/1991 | Japan . | |
| A-8-28357 | 1/1996 | Japan . | |
| 1445849 | 8/1976 | United Kingdom | 123/438 |

*Primary Examiner*—Tony M. Argenbright
*Attorney, Agent, or Firm*—Nixon & Vanderhye P.C.

[57] ABSTRACT

A single cylinder engine is equipped with a carburetor having an electrically controlled air bleed control valve. A microcomputer of an electronic controller calculates a target opening timing and a target opening time period of the air bleed control valve. The microcomputer, receiving a rotation pulse from a rotation sensor indicative of an engine rotational position, opens the air bleed control valve at the calculated target opening timing and for the calculated target opening period so that the air bleed control valve controls an amount of air-bleeding which in turn controls an air-fuel ratio of mixture supplied to the engine.

4 Claims, 8 Drawing Sheets

FUEL SUPPLY SYSTEM WITH CARBURETOR AIR BLEED CONTROL

BACKGROUND OF THE INVENTION

1. Field of the Invention

The present invention relates to a fuel supply system with an air bleed control for a carburetor, and particularly to a control for an internal combustion engine having a single cylinder and used for motor cycles, agricultural machines or an electric power generator.

2. Description of Related Art

It is known in a motor cycle engine, as disclosed in JP-A 3-246357, to use an electronically-controlled carburetor and control an air bleed amount in the carburetor by controlling opening and closing of an air bleed control valve in accordance with engine operating conditions thereby to control the amount of fuel supplied to the engine.

In this control, the opening and closing of the air bleed control valve is controlled by controlling its duty ratio but the duty ratio control timing is not timed with respect to rotation of the engine. Therefore, changes in the fuel supply from the carburetor and changes in the air-fuel mixture suction of the engine do not match in time and, as a result, the air bleed in the carburetor, the fuel supply to the engine and the air-fuel ratio of the air-fuel mixture changes.

SUMMARY OF THE INVENTION

It is therefore an object of the present invention to overcome the drawbacks of the conventional fuel supply system with air bleed control.

It is a further object of the present invention to control an air bleed amount in timed relation with rotation of an internal combustion engine, thereby stabilizing fuel supply from a carburetor and the air-fuel ratio of air-fuel mixture.

According to the present invention, an air bleed control valve is provide in a carburetor for an internal combustion engine and its air bleed is controlled at a predetermined timing in one operation cycle of the engine so that a desired fuel amount is supplied to the engine at the desired timing.

Preferably, the predetermined timing is set to substantially correspond to a start of opening of an engine intake valve.

Preferably, the amount of air bleed control is reduced at the time of engine acceleration.

BRIEF DESCRIPTION OF THE DRAWINGS

Other objects, features and advantages of the present invention will become more apparent from the following description when read in conjunction with the accompanying drawings, in which.

DETAILED DESCRIPTION OF A PRESENTLY PREFERRED EMBODIMENT

The present invention will be described in detail hereunder with reference to the drawings.

Figure 1:
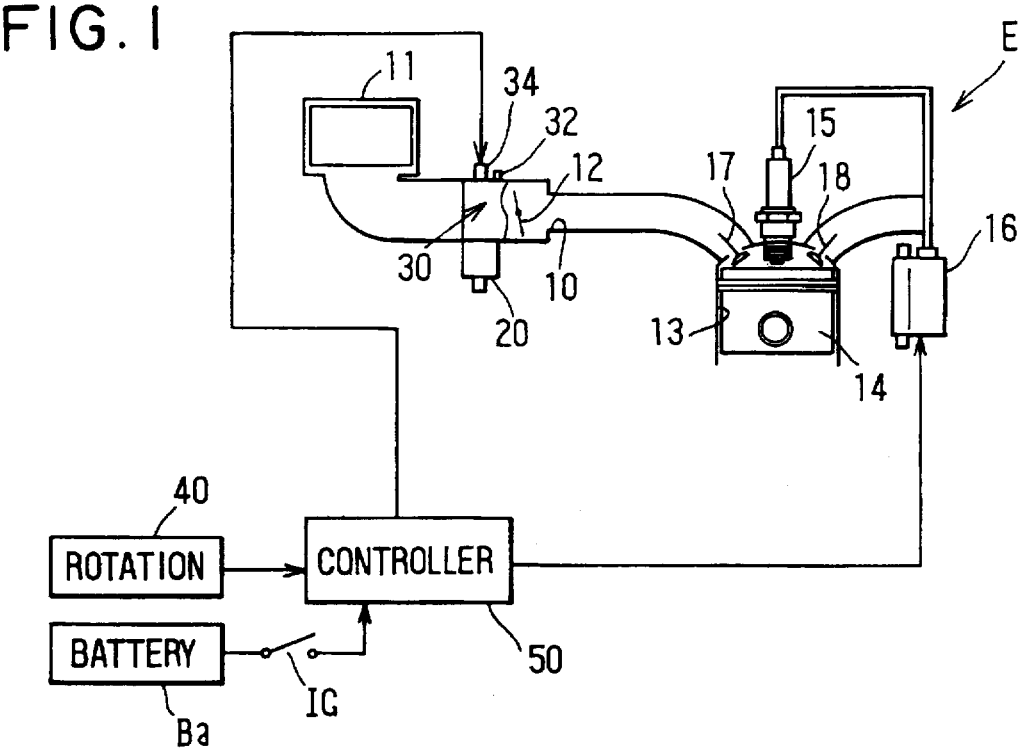
FIG. 1 is a schematic view showing an embodiment of the present invention applied to a single-cylinder engine for agricultural machines.

In FIG. 1, an engine E is a single-cylinder four-stroke type used for driving an agricultural machine and having a cylinder 13, a piston 14 in the cylinder 13, and intake and exhaust valves 17 and 18. The engine E is equipped with an air filter 11, an intake air passage 10, a carburetor 30 with a fuel reservoir 20 and a throttle valve 12. The fuel in the fuel reservoir is sucked into the carburetor 30 in accordance with the air flow in the intake air passage 10, mixed with the air and supplied into the cylinder 13 as the air-fuel mixture through the throttle valve 12 and the intake valve 17. The engine E is equipped further with a spark plug 15 and an ignition coil 16. In the engine E, the piston 14 moves downward in the cylinder 13 during the suction stroke to suck the mixture through the opened intake valve 17 and moves upward during the following compression stroke so that the compressed mixture is ignited by the ignition spark from the spark plug 15. Thus a mixture combustion occurs in the combustion stroke, in which the piston moves downward, and the combustion resultant gas is discharged through the opened exhaust valve 18 during the exhaust stroke by the following upward movement of the piston 14. The suction, compression, combustion and exhaust strokes completes one operation cycle of the engine E.

Figure 2:
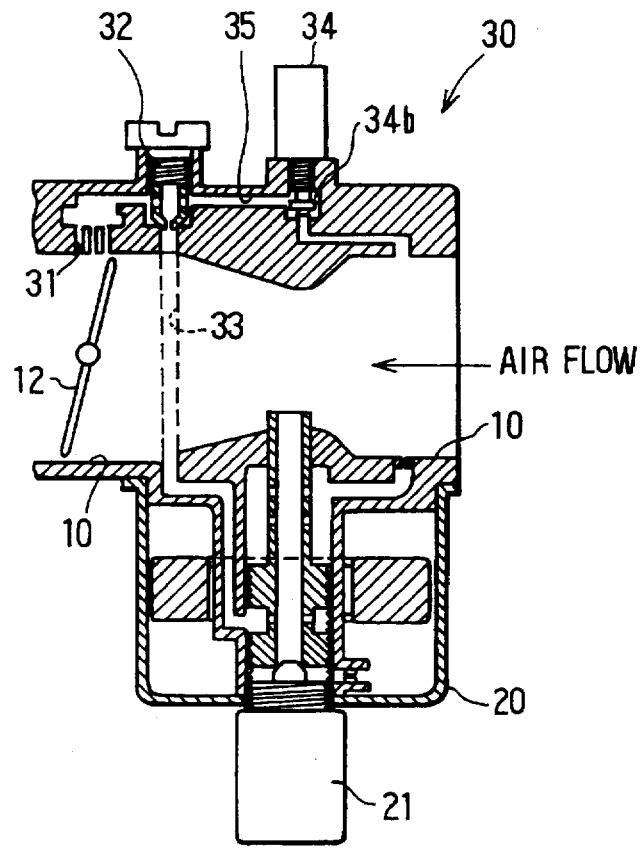
FIG. 2 is an enlarged cross-sectional view of a carburetor shown in FIG. 1.

The carburetor 30 has a construction shown in FIG. 2. In the carburetor 30, a vacuum generated downstream the throttle valve 12 exerts on a primary jet 32 through an opening 31 and the fuel in the fuel reservoir 20 is sucked into the downstream of the throttle valve 12 from the opening 31 through a fuel cut-off valve 21, a fuel passage 33 and the primary jet 32.

The carburetor 30 is equipped with a normally-closed type air bleed control valve 34 which is driven by its solenoid 34a (FIG. 3) to open a valve portion 34b disposed in a communication passage 35 opening to an upstream of the throttle valve 12. The vacuum in the primary jet 32 is transmitted to the upstream side of the throttle valve 12 through the communication passage 35 and the valve portion 34b of the air bleed control valve 34 in the open condition, resulting in the decrease of the vacuum. Thus, the air bleed amount and hence the fuel supply amount, i.e., the air-fuel ratio (A/F) of the mixture to the cylinder 13 can be controlled.

The air bleed control valve 34 and also the ignition coil 16 are connected to an electronic controller 50 which is in turn connected to a battery Ba through an ignition switch IG, a rotation sensor 40 and other sensors (not shown) for detecting various engine conditions, so that the fuel supply amount and the ignition timing are controlled electrically in accordance with engine operating conditions such as engine rotation speed.

The rotation sensor 40 is comprised of a magnetic pick-up and a rotary disk made of a magnetic material fixed to an engine output shaft (not shown) for rotation therewith. The disk has equi-angularly spaced 24 teeth intervals along an outer periphery thereon and 22 teeth are formed on corresponding teeth intervals except for two successive teeth intervals where two teeth are missing as a reference for TDC determination.

The magnetic pick-up is disposed to face the teeth and generate a rotation signal corresponding to each tooth to represent a rotational position of the engine E, thus generating 22 rotation signals in one rotation (360° crank angle rotation) of the output shaft. The rotation signal generated in correspondence with the first one of the teeth immediately after the two missing teeth is used to determine the top dead center (TDC) position of the piston 14.

Figure 3:
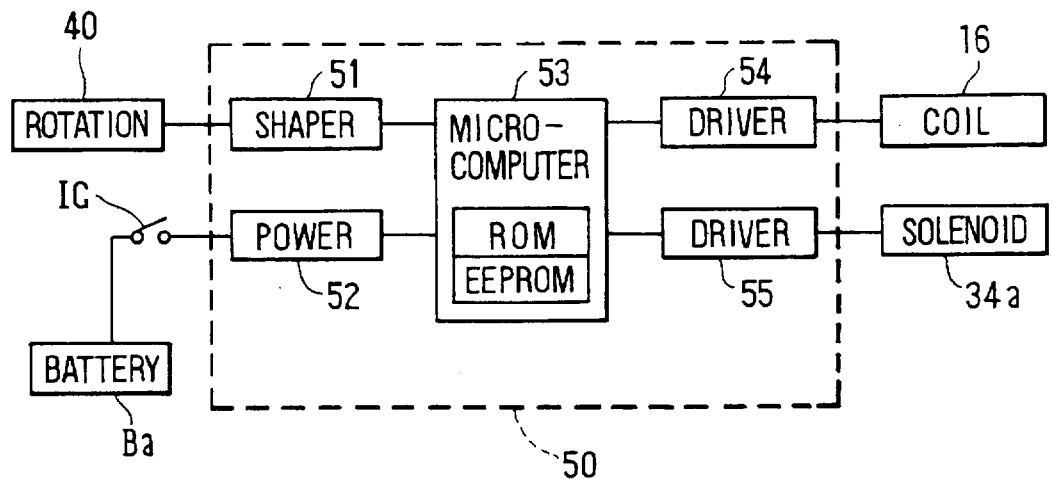
FIG. 3 is a block diagram of a controller shown in FIG. 1.

As best shown in FIG. 3, the controller 50 includes a waveform shaper circuit 51 and a power supply circuit 52. The waveform shaper circuit 51 shapes the waveform of the rotation signal from the rotation sensor 40 into a corresponding rotation pulse (FIG. 8), while the battery circuit 52 receives the battery voltage from the battery Ba through the ignition switch IG and generates a constant voltage.

A microcomputer 53 is programmed to perform processes shown in FIGS. 4 through 7 to control an ignition coil driver circuit 54 and a solenoid driver circuit 55 which in turn drives the ignition coil 16 and the solenoid 34a, respectively. The microcomputer 53 includes therein a ROM for storing a main program and an interrupt program and an EEPROM for storing various map data and calculation data produced during the execution of the programs.

Figure 4:
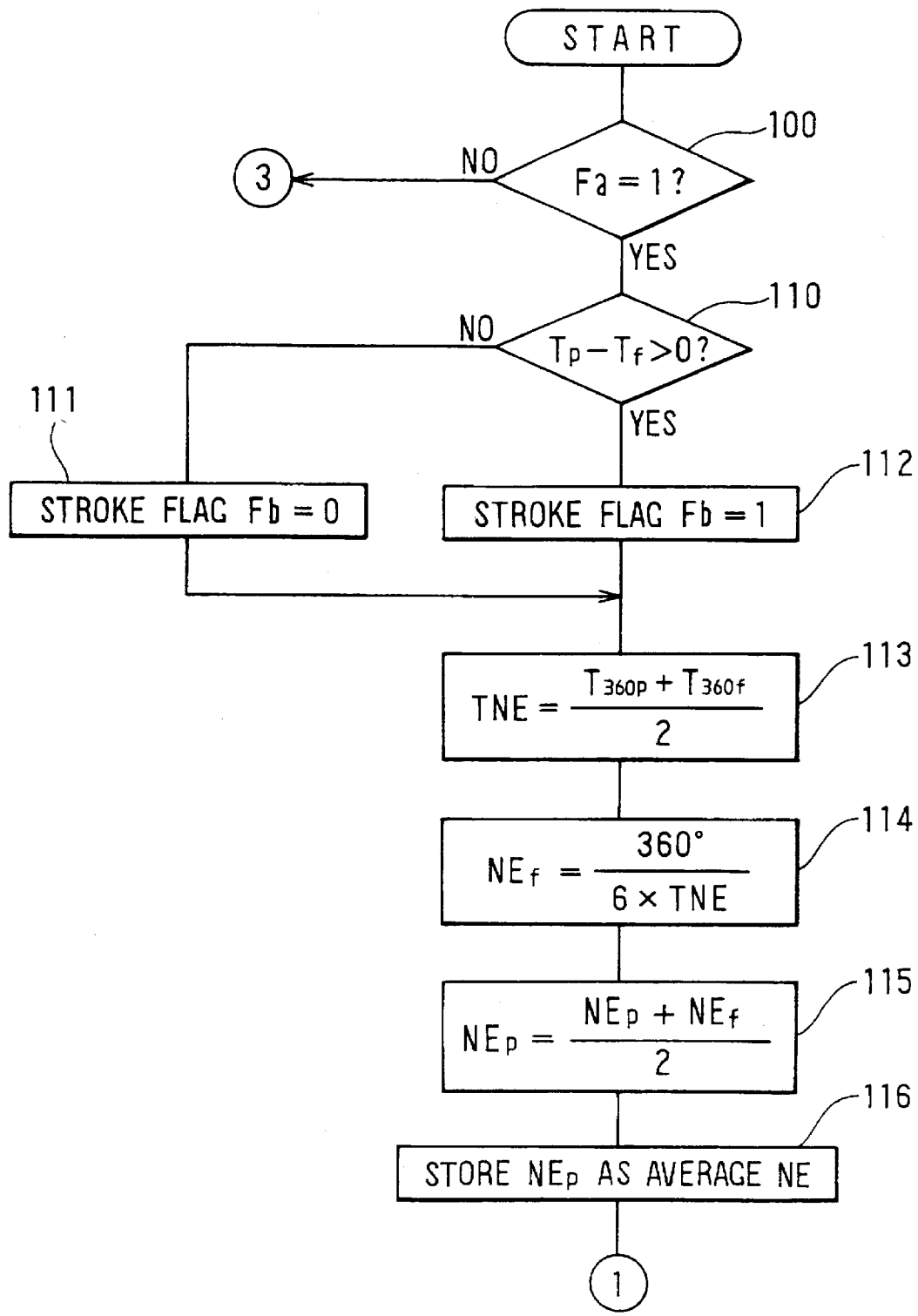
FIG. 4 is a flow chart of a part of a main program to be performed by a microcomputer shown in FIG. 1.
Figure 5:
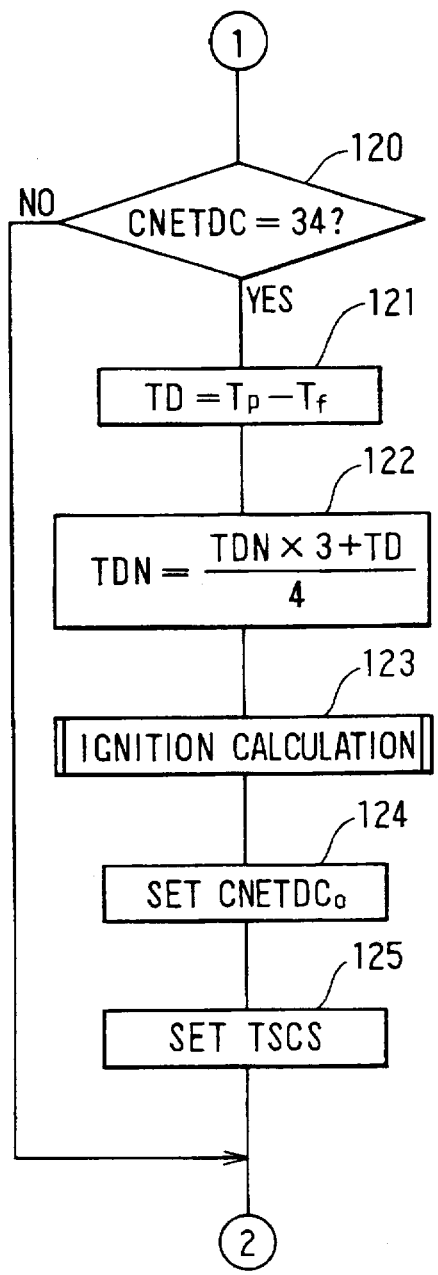
FIG. 5 is a flow chart of another part of the main program.
Figure 6:
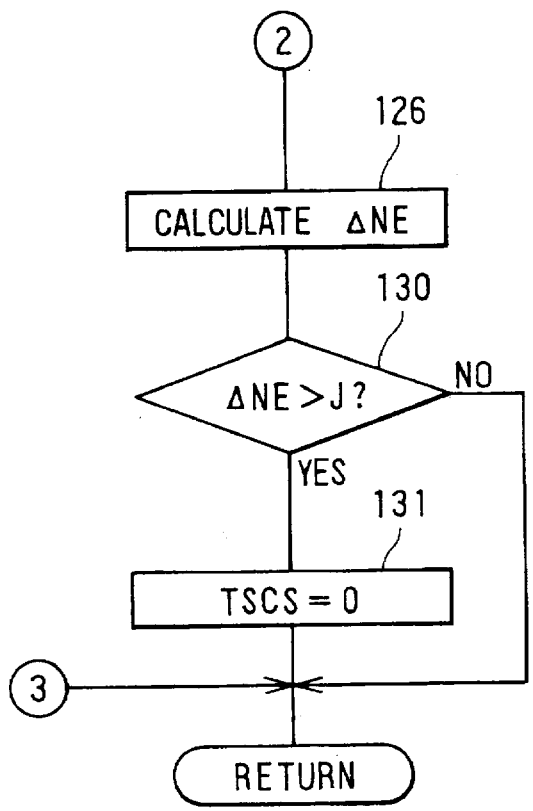
FIG. 6 is a flow chart of the other part of the main program.
Figure 7:
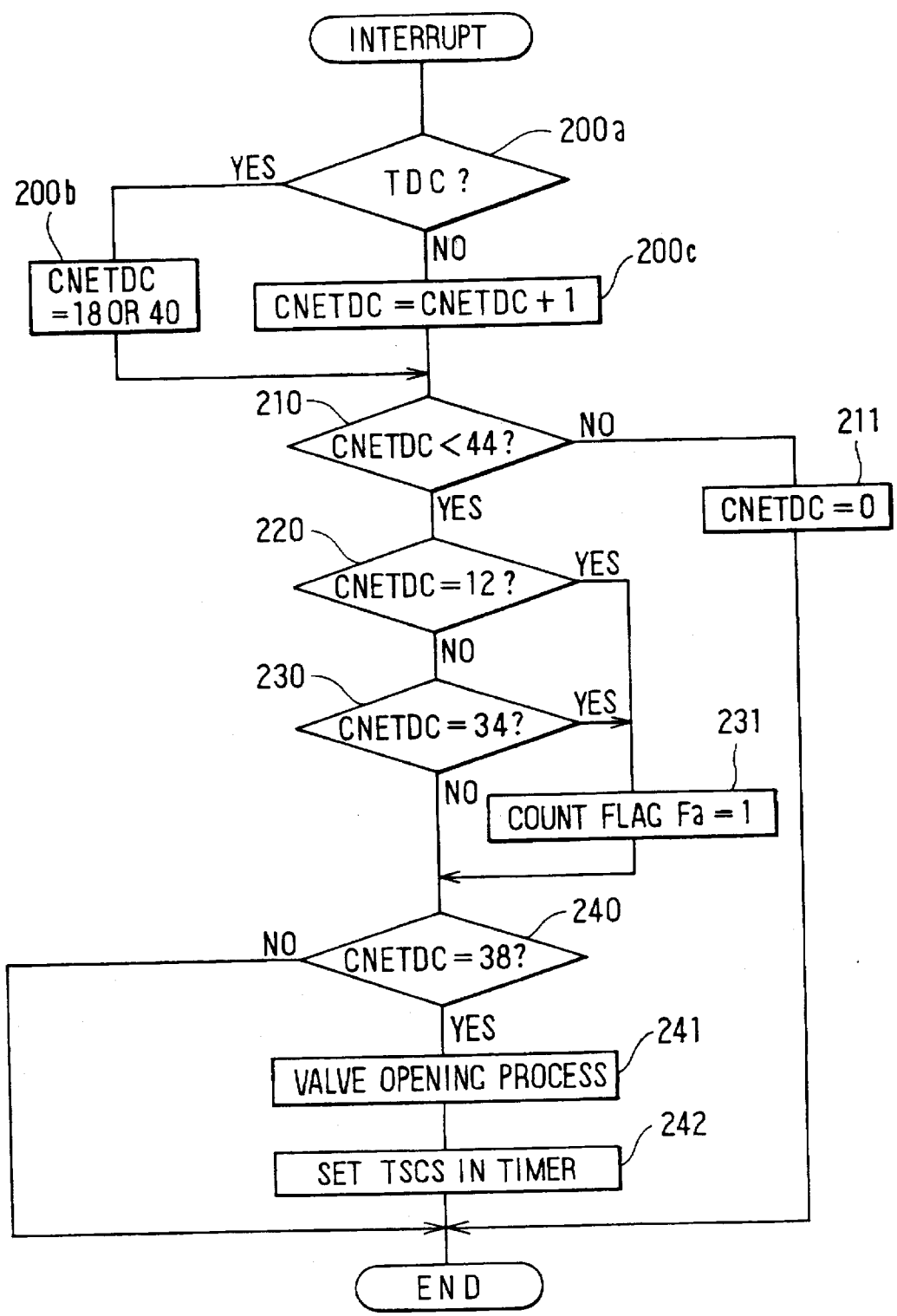
FIG. 7 is a flow chart of an interrupt program to be performed by the microcomputer shown in FIG. 1.

In operation in which the controller 50 is supplied with the battery voltage Ba and the engine E is rotating, the microcomputer 53 executes the main program shown in FIGS. 4 through 6 cyclically and also the interrupt program shown in FIG. 7 in response to the rotation pulse from the shaper circuit 51 (i.e., at every 15° angular interval).

In the main program of FIG. 4, a step 100 determines whether a count flag Fa (step 231 in the interrupt program in FIG. 7) is 1 or 0. With Fa=1 indicating that the piston 14 is at a bottom dead center BDC, the following step 110 calculates a time period Tp of engine rotation for 30° near the TDC of the piston 14 with a time period Tf of engine rotation for 30° near the BDC and compares the two calculated periods.

Figure 8:
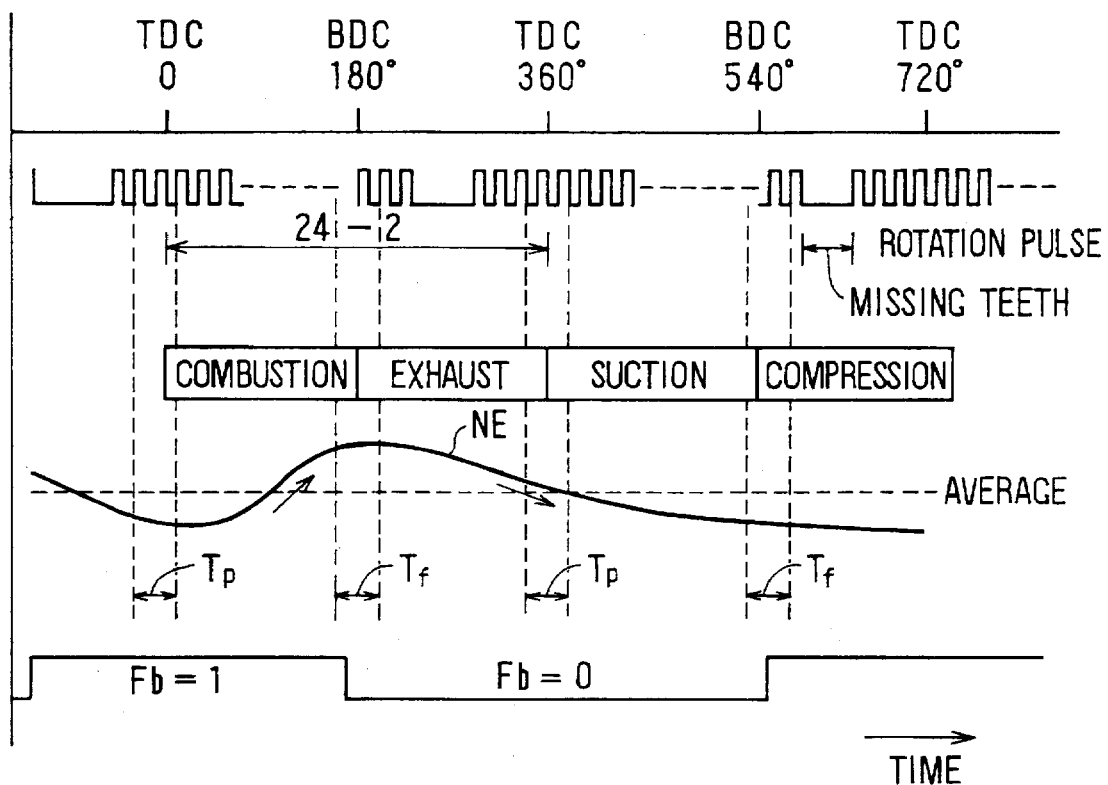
FIG. 8 is a timing chart showing a relation among a top dead center TDC and a bottom dead centers BDC of an engine cylinder, engine strokes, engine rotational speed changes and an engine stroke flag.

With Tp being greater than Tf, a step 112 sets a stroke determination flag Fb to 1 which indicates the combustion or compression stroke of the engine (FIG. 8). With Tp being smaller than Tf, on the other hand, a step 111 sets the flag Fb to 0 which indicates the suction or exhaust stroke of the engine.

Figure 9:
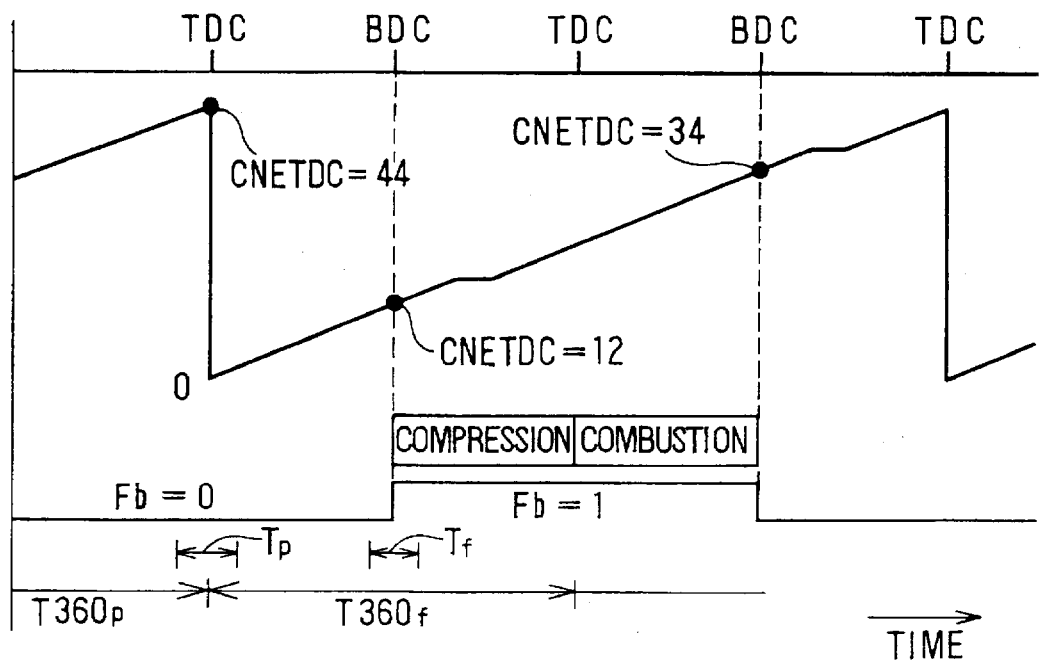
FIG. 9 is a timing chart showing a count value CNETDC, the engine stroke flag, a preceding one rotation period and a following one rotation period.

The following step 113 calculates, using the following equation (1), an average time period TNE of one rotation of the engine from a precedingly calculated one rotation period T360p and a subsequently calculated one rotation period T360f (FIG. 9).

$$TNE = (T360p + T360f)/2 \quad (1)$$

A step 114 calculates, using the following equation (2), a rotation speed NEf which follows a preceding rotation speed NEp from the thus calculated average period TNE.

$$NEf = 360°/(6 \times TNE) \quad (2)$$

Then, step 115 calculates, using the following equation (3), the preceding rotation speed NEp based on the further preceding rotation speed NEp and the subsequent rotation speed NEf.

$$NEp = (NEp + NEf)/2 \quad (3)$$

A following step 116 stores the preceding rotation speed NEp thus calculated in the EEPROM of the microcomputer 53 as an average engine rotation speed.

Thereafter, the process moves to the flowchart shown in FIG. 5, and it is determined at step 120 whether a count value CNETDC (obtained at a step 200 in FIG. 7 by a software counter of the microcomputer 53) is 34 which corresponds to the BDC of piston 14.

With CNETDC=34, a step 121 calculates, using the following equation (4), a difference TD in two rotation time periods from the calculated rotation periods Tp and Tf.

$$TD = Tp - Tf \quad (4)$$

A step 122 calculates, using the following equation (5), a current averaged time period TDN from the calculated time period difference TD and the averaged time period TDN previously calculated at the step 122.

$$TDN = (TDN \times 3 + TD)/4 \quad (5)$$

Figure 10A:
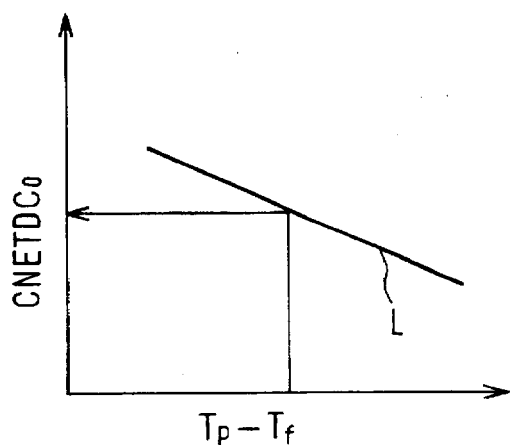
FIGS. 10A and 10B are a graph and a map showing a relation between Tp–Tf and a target count value CNETDCo and a relation among a target opening time TSCS, Tp–Tf and an average rotation speed NE, respectively.

After the step 122, a subroutine 123 calculates an ignition timing of the engine E from the preceding rotation speed NEp calculated at the step 116. Other engine conditions may be also used to calculate the ignition timing A step 124 sets a target count value CNETDCo (e.g., 38), which corresponds to the target opening timing SCS of the air bleed control valve 34, in correspondence with the calculated value Tp–Tf. It is to be noted that the target count value CNETDCo is stored in the EEPROM of the microcomputer 53 as a mapped data of a data map of FIG. 10A and that the relation between CNETDCo and Tp–Tf is defined by a linear function L.

Figure 10B:
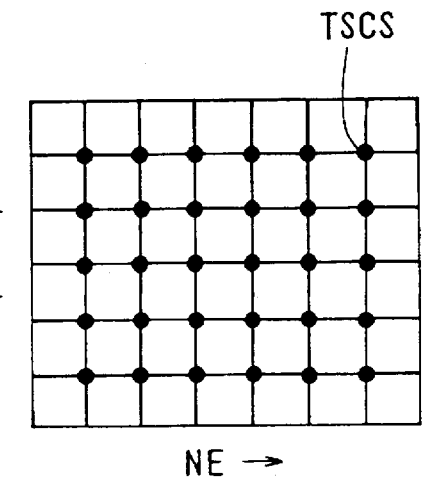

A step 125 sets a target opening time period TSCS of the air bleed control valve 34 in correspondence with the calculated values of Tp–Tf and NE. It is to be noted that the target opening time period TSCS is stored in the EEPROM of the microcomputer 53 as a mapped data of a data map of FIG. 10B defining the relation among Tp–Tf, NE and TSCS.

The process moves to a step 126 (FIG. 6) which calculates a rotation speed difference ΔNE between the precedingly and subsequently calculated averaged rotation speeds NE. A step 130 compares this speed difference ΔNE with an acceleration determination reference value J which corresponds to an acceleration condition of the engine E. With ΔNE being smaller than J, the engine E is considered as not in the acceleration condition.

With ΔNE being greater than J, on the other hand, the engine E is considered as in the acceleration condition, and a following step 131 clears the target opening time period TSCS, i.e., TSCS =0. Instead of clearing, the target opening time TSCS may be decreased.

In addition to the above-described main program, the microcomputer 53 executes an interrupt program shown in FIG. 7 interrupting the execution of the main program in response to the rotation pulse signal from the waveform shaper circuit 51.

In the interrupt process, a step 200a determines whether the rotation pulse just received is immediately after the two missing teeth indicating that the piston is approaching TDC. If it is near the TDC, a step 200b sets the count value CNETDC to 18 or 40 and is followed by a step 210 which compares CNETDC with 44. If it is not near TDC, a step 200c increments the count value CNETDC to CNETDC+1 and is followed by the step 210.

With CNETDC being not smaller than 44, a step 211 sets CNETDC to 0 and the interrupt process ends. On the other hand, with CNETDC being smaller than 44 which corresponds to TDC position of the piston 13 after completion of one engine rotation as shown in FIG. 9, steps 220 and 230 which determine whether CNETDC is 12 and 34 respectively follows.

With CNETDC being equal to 12 or 34 which corresponds to the BDC position, i.e., a start of the compression stroke (start of Fb=1) or an end of the exhaust stroke (start of Fb=1), a step 231 sets the count flag Fa to 1.

Figure 12:
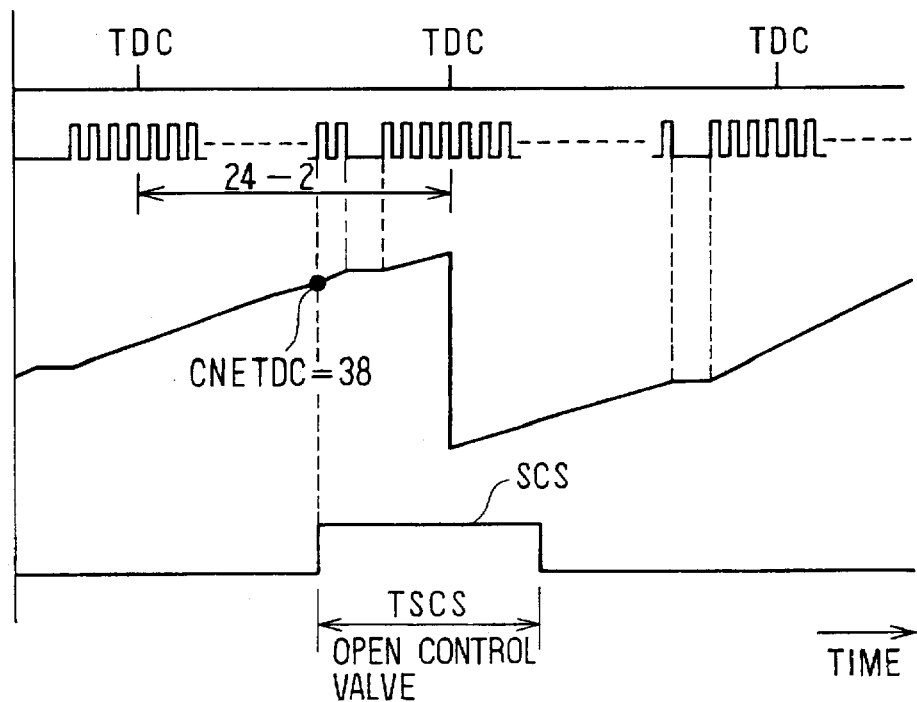
FIG. 12 is a timing chart showing the TDC and BDC of the cylinder, a rotation pulse signal, the count value CNETDC, SCS and TSCS.

Thereafter, a step 240 compares CNETDC with 38 which corresponds to a predetermined piston position during the exhaust stroke of the engine E as shown in FIGS. 9 and 12.

With CNETDC=38 (at which the intake valve 17 starts to open in the course of the exhaust stroke), a step 241 opens the air bleed control valve 34. That is, the target opening timing SCS is set to 1 (high level) as shown in FIG. 12.

Then, a step 242 sets a target opening time period TSCS in a timer of the microcomputer 53. Thus, the timer starts counting the target time period TSCS from the target timing SCS (start timing of opening the air bleed control valve 34). After the elapse of the target time TSCS, the target timing is returned to low level, i.e., closure timing of the air bleed control valve 34, as shown in FIG. 12.

According to the opening and closing control of the air bleed control valve 34 as described above, the vacuum in the primary jet 32 decreases by air-bleeding during the opening period of the air bleed control valve 34, thus reducing the amount of fuel sucked toward the downstream of the throttle valve 12. Thus, the opening of the air bleed control valve 34 is timed with the rotation pulse, i.e., rotational position of the engine E. Therefore, the amount of air-bleeding, the amount of fuel and hence the air-fuel ratio of air-fuel mixture supplied into the cylinder 13 is controlled optimumly. This mixture is ignited by the spark generated by the spark plug 15 at the ignition timing calculated by the ignition timing calculation subroutine 123.

Figure 13:
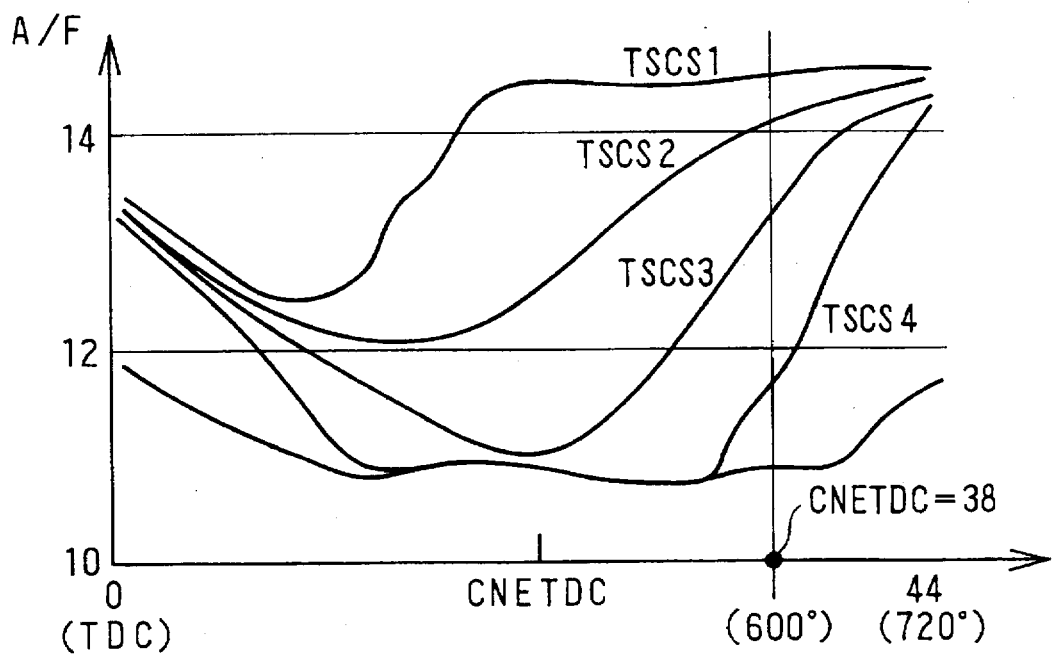
FIG. 13 is a graph showing a relation between CNETDC and A/F with TSCS being used as a parameter.
Figure 14:
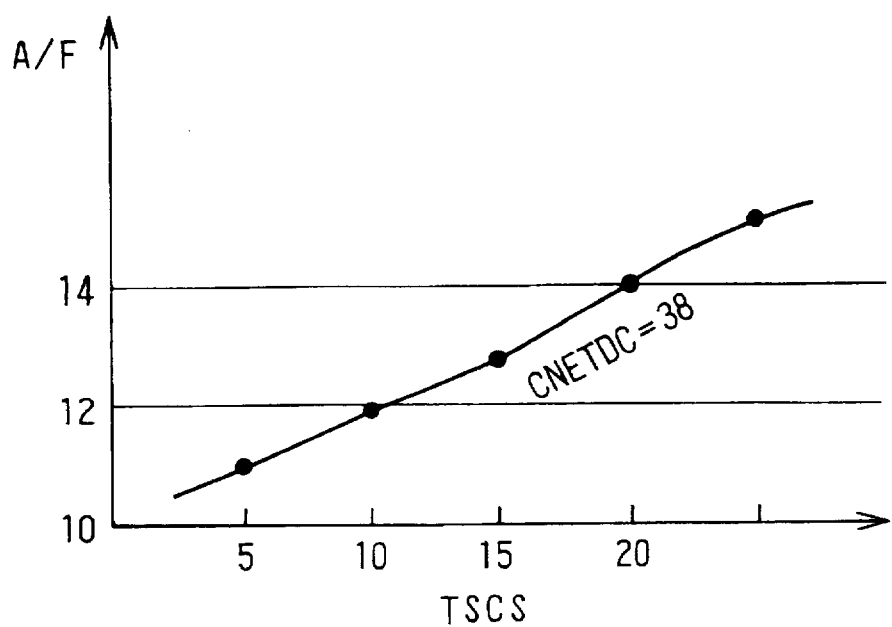
FIG. 14 is a graph showing relation between TSCS and A/F with CNETDC=38 being used as a parameter.

The relation between the count value CNETDC and the air-fuel ratio A/F obtained experimentally by varying the target opening time CNETDC as a parameter is shown in FIG. 13. The relation between the air-fuel ratio A/F and the target opening time period TSCS for the case of CNETDC=38 is shown in FIG. 14.

It will be understood from those relations that A/F and TSCS are generally in a linear relation for a specified value of CNETDC. This means that the air-fuel ratio A/F can be controlled linearly and stably relative to the target opening time TSCS as long as the count value CNETDC is kept fixed. It is most preferred to set CNETDC to a value which is larger than 34 and corresponds to a start timing of opening of the intake valve 17 which occurs in the exhaust stroke of the engine E.

Figure 11:
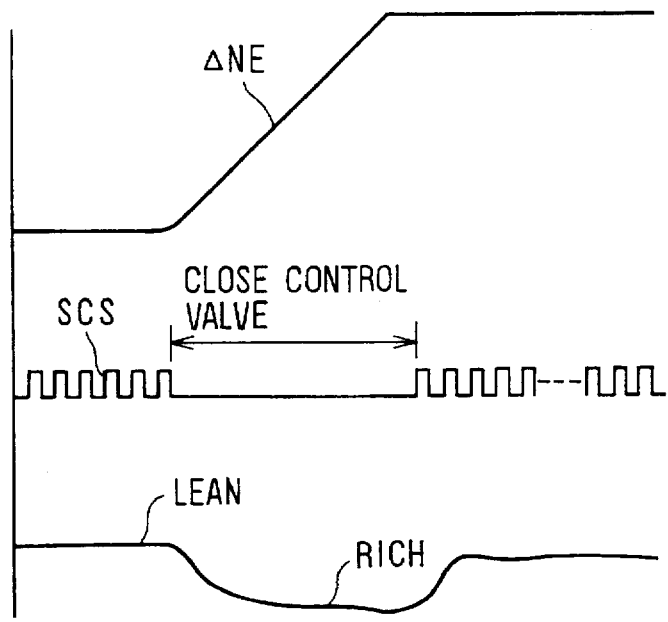
FIG. 11 is a timing chart showing ΔN, SCS and A/F during engine acceleration.

In the above-described operation, when the engine E is in the acceleration condition, the step 131 clears the target opening time period TSCS to 0 thereby to keep the air bleed control valve 34 closed as shown in FIG. 11. Therefore, the air-fuel mixture is enriched to match the acceleration.

Although the output of the rotation sensor and the load condition calculated from the output of the same are used to control opening and closing of the air bleed control valve 34 in the embodiment, other engine conditions such as engine vacuum and engine coolant temperature may be used as well as the output of the rotation sensor for the similar control. The air bleed control valve 34 need not be an opening/closing type but may be a type which changes its opening degree linearly. Further, controlling opening timing and opening time period of the air bleed control 34 by the steps 241 and 242 may be replaced by controlling closing timing and closing time period.

The present invention is not limited to the single cylinder engine but may be used for a multiple cylinder engine.

What is claimed is:

1. A fuel supply system for an engine, said system comprising:

a carburetor for supplying the engine with fuel in accordance with air flow to the engine; and an air bleed control means for controlling carburetor air bleed in accordance with engine load thereby controlling air supplied from the carburetor, said control means controlling the amount of the air bleed in timed relation with a predetermined time in an operation cycle of the engine;

said air bleed control means including setting means for setting a time period in accordance with at least one of: (a) rotation speed and (b) load of the engine; and said air bleed control means changing the amount of air bleed to a predetermined value for the set time period from the predetermined time and returns, after an elapse of the set time period, the air bleed to a value existing before the predetermined time.

2. A fuel supply system as in claim 1, wherein:

said air bleed control means includes acceleration determining means for determining an acceleration condition of the engine; and said setting means shortens said time period upon determination of the acceleration condition.

3. A method of supplying fuel to an engine, said method comprising:

supplying the engine with fuel in accordance with air flow to the engine; and controlling carburetor air bleed in accordance with engine load thereby controlling air supplied from the carburetor, controlling the amount of the air bleed in timed relation with a predetermined time in an operation cycle of the engine;

setting a time period in accordance with at least one of: (a) rotation speed and (b) load of the engine; and changing the amount of air bleed to a predetermined value for the set time period from the predetermined time and returns, after an elapse of the set time period, the air bleed to a value existing before the predetermined time.

4. A method as in claim 3 further comprising:

determining an acceleration condition of the engine; and shortening said time period upon determination of the acceleration condition.

* * * * *